United States Patent [19]

Grossart

[11] 4,010,982
[45] Mar. 8, 1977

[54] VEHICLE-TRAILER BRAKING SYSTEM

[75] Inventor: Stuart James Cameron Grossart, Coventry, England

[73] Assignee: Massey-Ferguson Services N.V., Curacao, Netherlands Antilles

[22] Filed: Sept. 30, 1975

[21] Appl. No.: 618,198

[30] Foreign Application Priority Data

Oct. 2, 1974 United Kingdom ............ 42839/74
Oct. 4, 1974 United Kingdom ............ 43263/74

[52] U.S. Cl. ................................ 303/10; 74/512; 188/3 R; 303/50
[51] Int. Cl.² ........................................ B60T 13/14
[58] Field of Search ............ 303/7, 13, 6 R, 6 A, 303/10, 50, 52, 54, 56, 114, 117, 115; 188/16, 106 F, 106 R, 106 P, 354, 359, 2 R, 3; 74/512, 478

[56] References Cited
UNITED STATES PATENTS

| | | | |
|---|---|---|---|
| 2,513,486 | 7/1950 | Herman | 303/54 |
| 3,441,108 | 4/1969 | Boueil et al. | 188/3 R |
| 3,606,495 | 9/1971 | Bion | 303/54 |
| 3,661,429 | 5/1972 | Kito | 303/54 |
| 3,740,102 | 6/1973 | Schwerin | 303/13 |
| 3,788,709 | 1/1974 | Schwerin | 303/7 |

Primary Examiner—Trygve M. Blix
Assistant Examiner—Douglas C. Butler
Attorney, Agent, or Firm—Thomas P. Lewandowski

[57] ABSTRACT

Braking systems for tractor and trailer combinations. A valve is mounted on the brake pedal of a vehicle and a second pedal pivotally connected to the brake pedal. The second pedal is connected to the spool of the valve by a spring. Depression of the second pedal allows fluid through the valve to the trailer brakes. Pressure in the trailer brakes acts between the spool and the body to bias the spool to compress the spring. This force is reacted by the brake pedal and thus the brake pedal is actuated by a force proportional to the force in the trailer brakes.

6 Claims, 5 Drawing Figures

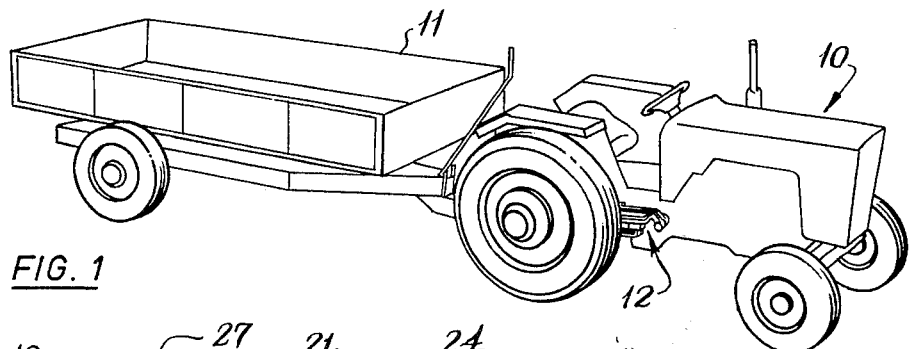
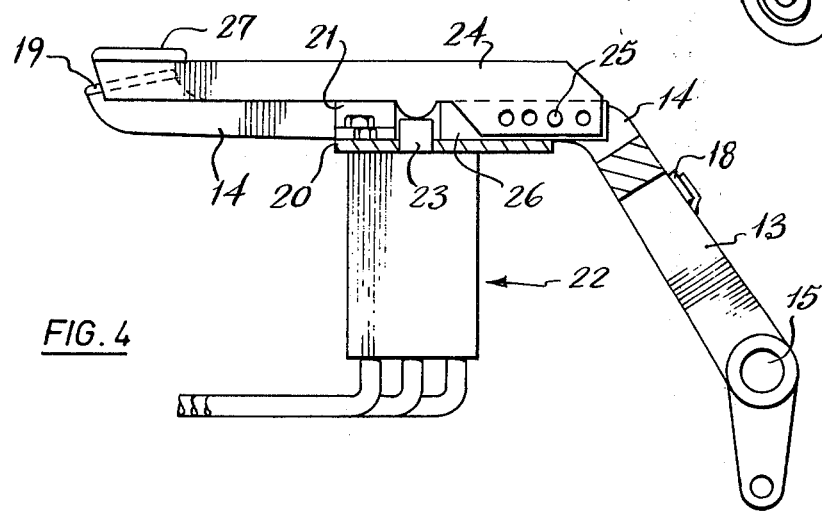
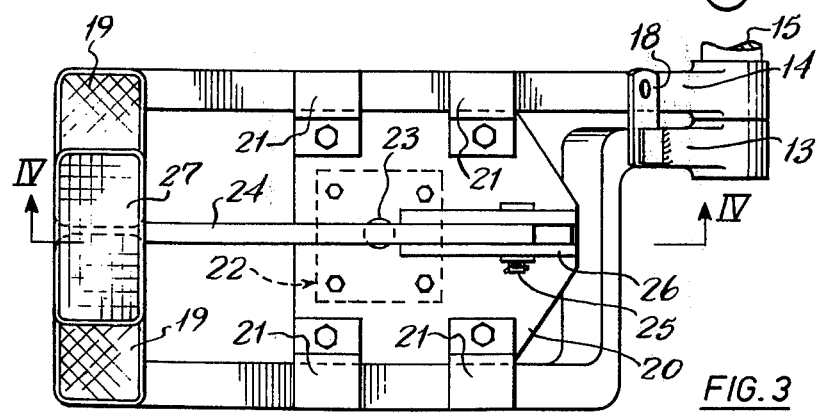

VEHICLE-TRAILER BRAKING SYSTEM

This invention relates to braking systems for vehicles and in particular to braking systems for trailed vehicles.

When using a tractor and trailer in combination it is desirable that any braking effort applied to the tractor brakes is also proportionally applied to the trailer brakes. Further the system employed should be simple, easy to operate and robust. Prior proposals have not met all of the above requirements.

It is an object of the present invention to provide such a system.

According to the present invention a braking system comprises a source of pressurised fluid, at least one hydraulic actuator operable to engage a brake, a supply line connecting said source of pressurised fluid to said actuator, a return line connecting said actuator with a source of low pressure fluid, valve means for controlling flow through said supply and return lines, said valve means comprising a body, a spool movable from a first position which prevents flow through the supply line but allows flow through the return line to a second position which allows flow through the supply line but prevents flow through the return line, and a gallery formed between said spool and said body, said spool being resiliently connected to a manual control device, the arrangement being that movement of said manual control device moves said spool from said first position to said second position and that pressurised fluid acts in said gallery upon said spool to return it to said first position.

According also to the present invention a pedal assembly comprises a first link pivotally mounted and operable upon a braking device, a second link pivotally connected to said first link, a valve including a body mounted on said first link and a spool movable in said body and operatively connected to said second link by resilient means.

According further to the present invention a braking system for a vehicle comprises at least one brake pedal operable to engage a brake to retard said vehicle, a second pedal pivotally mounted on said first pedal, a valve operable to control flow of fluid to or from a second braking system, said valve comprising a body and a spool movable within said body, said body being mounted on said first pedal and said spool being operatively connected to said second pedal by resilient means.

An embodiment of the invention will now be described by way of example only with reference to the accompanying drawings in which FIG. 1 is a view showing a tractor and trailer combination.

FIG. 3 is a plan view of the pedal assembly of FIG. 2.

FIG. 4 is a view on the line IV — IV of FIG. 3.

Figure 2:
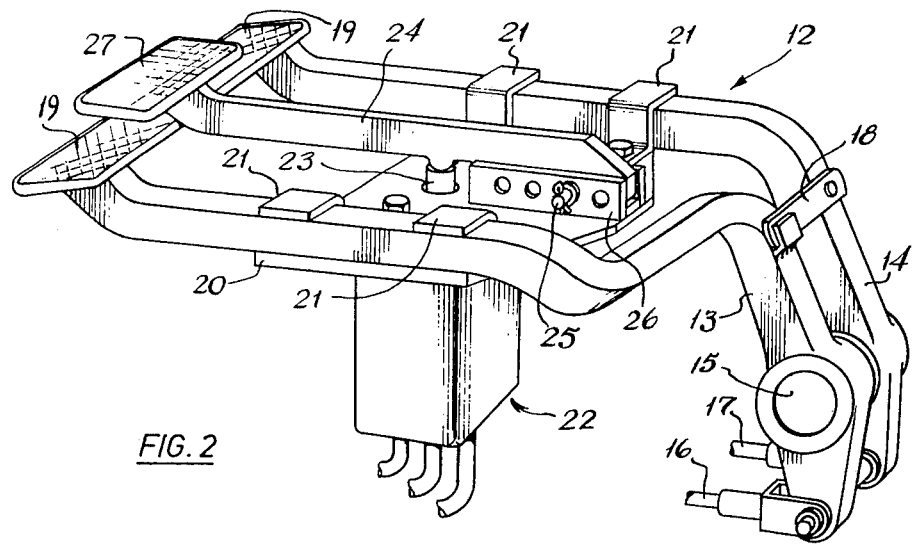
FIG. 2 is a perspective view of a pedal assembly.

Referring to FIG. 1, a tractor 10 is connected to a trailer 11. The tractor and trailer brakes are operated by a pedal assembly 12 which is best seen in FIG. 2.

The assembly comprises a pair of pedals 13, 14 which are pivotally mounted on a shaft 15 attached to the tractor 10 and have footplates 19 formed integrally therewith. The pedals 13, 14 are respectively connected to a linkage 16, 17 each of which operate a brake for one of the rear wheels of the tractor. The pedals 13, 14 may be connected for conjoint movement by a latch assembly 18 so that both brakes are applied simultaneously.

A base plate or plate 20 is mounted below the pedals 13, 14 and secured thereto by clamps 21 which are bolted to the plate. A valve assembly 22 is bolted to the plate 20 with a projection 23 protruding through it. Hydraulic fluid is conveyed to and from the valve assembly 22 by pipes. The projection 23 abuts a pedal 24 which is pivotally connected by a pin 25 to a pair of upstanding plates 26 fixed to the plate 20. The pedal 24 is formed with a footplate 27 which partially covers the footplates 19 in plan view.

Figure 5:
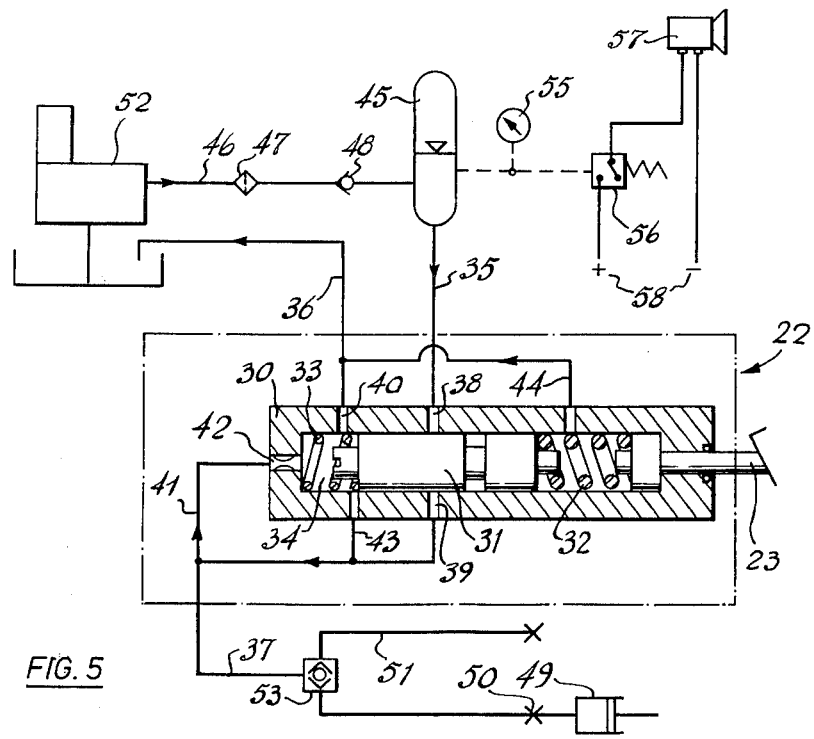
FIG. 5 is a diagrammatic representation of a hydraulic braking circuit.

Referring now to FIG. 5 the valve assembly 22 comprises a body 30 in which a spool 31 is slidably mounted. A spring 32 is placed between the spool 31 and the projection 23 and the two are biased towards each other by a second spring 33 which is housed within a chamber 34 formed between the spool 31 and the body 30.

The hydraulic pipes comprise a supply line 35, a return line 36 and a brake line 37. The supply line 35 is connected to a port 38 in the body 30 the brake line 37 to a port 39 and the return line 36 to a port 40 which communicates with the chamber 34. The brake line 37 is connected to the chamber 34 by a sensing conduit 41 and an orifice 42 formed in the body 30 and also by a fast drain line 43. A drain line 44 is connected between the body 30 and the return line 36.

Fluid is delivered to the supply line 35 from an accumulator 45 which is charged from a sump by means of a pump 52 supplying pressurised fluid through a conduit 46 a filter 47 and a check valve 48. The brake line 37 is connected to a brake actuator 49 on the trailer by a quick release coupling 50. Provision is made for the operation of more than one trailer by a branch line 51 which is connected to the brake line 37 by a two way check valve 53.

The operation of the device is as follows. The tractor and trailer brakes are applied by pressure on the footplate 27. This causes the pedal 24 to pivot about the pin 25 and move the projection 23 along the body 30. The spring 32 is stiffer than the spring 33 and so the annular recess in the spool 31 is aligned with the port 38 and the port 40 is closed. Fluid thus flows from the supply line 35 to the braking line 37 and to the actuator 49. As the pressure builds up in the line 37 it is felt in the chamber 34 and moves spool 31 to compress the spring 32. The flow is thus stopped through the port 38 and the port 40 opened. Fluid will thus flow through the sensing conduit 41 and orifice 42 into the return 36. The orifice 42 restricts the flow from the sensing conduit 41 to the chamber 34 and hence prevents rapid pressure fluctuations in the line 41. The force of the spring 32 will be balanced by the pressure in the chamber 34 so that the spool 31 occupies a position in which the flow through the return line 36 and through supply line 35 is prevented. The pressure in the chamber 34, and hence the pressure in the sensing conduit 41 will vary according to the position of the plunger 23 and so a proportional braking effect is obtained. Further, since the net force acting on the body 30 is reacted by the brake pedals 13, 14, the braking effect of the tractor brakes is also proportional to the force applied to the footplate 27.

When the brakes are released, the spring 34 moves the spool 31 along the body 30 and uncovers the fast drain line 43. Fluid can thus flow unrestricted from the actuator 49 to the sump.

A warning device comprising a pressure gauge 55, a pressure responsive electrical switch connected between and an electrically operated horn 57 and an electrical supply 58 is connected to the accumulator 45 to indicate the pressure in the accumulator and to give an audible warning should it fall below a certain level.

Should it be desirable to operate the pedals 16, 17 independently then the plate 20 may be pivotally mounted to one of the pedals and the other end connected by a pin and slot mechanism in the manner of a "walking beam".

Although the system is described with reference to a system using oil as a working medium it is to be understood that the system is equally applicable to a system using air as a working medium and the term fluid should be so construed.

What we claim is:

1. A braking system having a source of pressurized fluid, a reservoir, a hydraulic actuator, a brake, said actuator operable to cause engagement of said brake, a return and a supply line connecting said actuator with said reservoir and source of pressurized fluid, respectively, valve means for controlling flow through said supply and return lines including a body, a spool, said body having first and second ports therein, said first port connected to said supply line, said second port connected to said return line, said spool closing said first port when said second port is open and vice versa, a chamber formed between said spool and said body and means for biasing said spool including a first conduit connecting said chamber to said actuator for biasing said spool on said chamber side, and a second conduit between said actuator and said chamber to provide an unrestricted fluid path with said spool in said first position, a manual control device and a resilient connecting means between said manual control device and said spool to permit said manual control device to move said spool to a position opening said first port and then said conduit for biasing said spool, and said means for biasing said spool to then return said spool to a second position opening said second port and closing said first port to maintain a force on the brake system proportional to the force applied on said manual control device.

2. The braking system of claim 1 including a restrictive orifice in said first conduit to limit the flow rate therethrough.

3. A braking system according to claim 1 wherein said means for biasing said spool includes a spring provided in said chamber to resiliently bias said spool toward said first position.

4. A braking system according to claim 1 wherein said resilient connecting means between said spool and said manual control device comprises a spring operable between said spool and said manual control device to oppose relative movement toward each other.

5. A braking system for a vehicle having two brake pedals operable to engage brakes to retard said vehicle, a baseplate detachably mounted on said pedals, a third pedal pivotally mounted on said baseplate, a valve operable to control flow of fluid to or from a second braking system, said valve comprising a body and a spool movable within said body, said body being mounted on said baseplate and said spool engaging said third pedal at a spaced location from and pivotally connected to said baseplate and resilient means biasing said spool against said third pedal and said body and baseplate against said first two pedals to oppose relative movement toward each other.

6. A braking system according to claim 5 wherein a chamber is formed between said spool and said body, said chamber being hydraulically connected to said second brake system whereby pressure therein acts in said chamber to bias said spool toward said second pedal, such movement being opposed by said resilient means.

* * * * *